US009820242B2

(12) United States Patent
Kim et al.

(10) Patent No.: US 9,820,242 B2
(45) Date of Patent: Nov. 14, 2017

(54) METHOD AND APPARATUS FOR CONFIGURING POWER HEADROOM INFORMATION IN MOBILE COMMUNICATION SYSTEM SUPPORTING CARRIER AGGREGATION

(71) Applicant: Samsung Electronics Co., Ltd., Suwon-si, Gyeonggi-do (KR)

(72) Inventors: Soeng Hun Kim, Yongin-si (KR); Sang Bum Kim, Seoul (KR); Kyeong In Jeong, Suwon-si (KR); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/847,828

(22) Filed: Sep. 8, 2015

(65) Prior Publication Data

US 2015/0382310 A1 Dec. 31, 2015

Related U.S. Application Data

(63) Continuation of application No. 14/591,409, filed on Jan. 7, 2015, which is a continuation of application (Continued)

(30) Foreign Application Priority Data

Jul. 26, 2011 (KR) ........................ 10-2011-0074076

(51) Int. Cl.
*H04B 7/00* (2006.01)
*H04W 52/36* (2009.01)
(Continued)

(52) U.S. Cl.
CPC ......... *H04W 52/365* (2013.01); *H04W 52/34* (2013.01); *H04W 52/58* (2013.01); *H04W 88/02* (2013.01); *H04W 88/08* (2013.01)

(58) Field of Classification Search
CPC . H04W 52/365; H04W 52/367; H04W 88/02; H04W 72/0413; H04W 84/045;
(Continued)

(56) References Cited

U.S. PATENT DOCUMENTS 9,736,775 B2 8/2017 Jung et al.
2008/0084848 A1 4/2008 Jard et al.
(Continued)

FOREIGN PATENT DOCUMENTS

CN 101414947 A 4/2009
CN 101778416 A 7/2010
(Continued)

OTHER PUBLICATIONS

Potevio, "Remaining Issues on PHR for CA", 3GPP TSG RAN WG2 #70, R2-102770, May 1, 2010, Montreal, Canada.
(Continued)

*Primary Examiner* — Shaima Q Aminzay
(74) *Attorney, Agent, or Firm* — Jefferson IP Law, LLP

(57) ABSTRACT

A method and apparatus for configuring Power Headroom Report (PHR) of a User Equipment (UE) efficiently in a mobile communication system supporting carrier aggregation are provided. The method includes generating a header including a LCID for identifying extended PHR and L indicating a length of the extended PHR, and inserting Power Headrooms (PHs) of multiple activated carriers into the extended PHR of one of the carriers.

20 Claims, 12 Drawing Sheets

Related U.S. Application Data

No. 13/206,779, filed on Aug. 10, 2011, now Pat. No. 8,954,106.

(60) Provisional application No. 61/372,452, filed on Aug. 10, 2010, provisional application No. 61/374,160, filed on Aug. 16, 2010, provisional application No. 61/383,437, filed on Sep. 16, 2010, provisional application No. 61/389,476, filed on Oct. 4, 2010, provisional application No. 61/392,436, filed on Oct. 12, 2010, provisional application No. 61/410,493, filed on Nov. 5, 2010.

(51) Int. Cl.
| | | |
|---|---|---|
| *H04W 52/34* | (2009.01) | |
| *H04W 52/58* | (2009.01) | |
| *H04W 88/02* | (2009.01) | |
| *H04W 88/08* | (2009.01) | |

(58) Field of Classification Search
CPC ............ H04W 88/08; H04W 72/0406; H04W 72/0446; H04W 72/0473; H04W 72/1278; H04W 72/1284
See application file for complete search history.

(56) References Cited

U.S. PATENT DOCUMENTS

| 2010/0158147 | A1 | 6/2010 | Zhang et al. |
|---|---|---|---|
| 2010/0232385 | A1 | 9/2010 | Hsu |
| 2010/0297993 | A1 | 11/2010 | Heo et al. |
| 2011/0242972 | A1 | 10/2011 | Sebire et al. |
| 2012/0294167 | A1 | 11/2012 | Zhu et al. |

FOREIGN PATENT DOCUMENTS

| EP | 1 912 345 B1 | 11/2011 |
|---|---|---|
| EP | 2 536 198 A1 | 12/2012 |
| KR | 10-2009-0101786 A | 9/2009 |
| KR | 10-2009-0131653 A | 12/2009 |
| KR | 10-2010-0009493 A | 1/2010 |
| WO | 2010/065759 A2 | 6/2010 |
| WO | 2010/091425 A2 | 8/2010 |

OTHER PUBLICATIONS

Nokia Siemens Networks, "Details of PHR for Carrier Aggregation", 3GPP TSG-RAN WG2 Meeting #70bis, R2-103558, Jun. 22, 2010, Stockholm, Sweden.

ZTE; "Parallel Transmission of Two Types PHR", 3GPP TSG RAN WG2 #70bis, R2-103725, Jun. 22, 2010, Stockholm, Sweden.

LG Electronics Inc., "PHR Format for CA", 3GPP TSG-RAN2 Meeting #70bis, R2-103937, Jun. 28, 2010, Stockholm, Sweden, Parent database U.S. Appl. No. 14/591,409.

New Postcom, CATR, "Design of PHR MAC CE Format for CA", 3GPP TSG-RAN2#72, R2-106542, Nov. 15, 2010, Jacksonville, USA, Parent database U.S. Appl. No. 14/591,409.

Ericsson et al., Details of PHR Handling for CA, 3GPP TSG-RAN WG2 #70bis, Stockholm, Sweden, Jun. 28-Jul. 2, 2010, pp. 1-3, Tdoc R2-103570.

Nokia Siemens Networks et al., Further Consideration on Virtual PHR, 3GPP TSG-RAN WG2 Meeting #71, Vladrid, Spain, Aug. 23-27, 2010, R2-104394.

Mediatek, Further Details for Rel-10 PHR, 3GPP TSG-RAN WG2 Meeting #71bis, Xi'an, China, Oct. 11-15, 2010, R2-105444.

Panasonic; "UE-specific Power headroom report"; Jun. 28-Jul. 3, 2010; 3GPP TSG-RAN WG2 Meeting #70bis; R2-103602; Stockholm, Sweden.

Research in Motion et al; "Discussion on Per UE PHR"; Oct. 11-15, 2010; 3GPP TSG-RAN WG1 #62bis; R1-104917; Xian, China.

Ericsson; Summary of e-mail discussion [71#571] LTE CA: PHR Reporting; Oct. 11-15, 2010; 3GPP TSG-RAN WG2 #71bis; R2-105462.

Alcatel-Lucent et al: "Discussion on PHR remaining issues"; Oct. 11-15, 2010; 3GPP TSG-RAN WG2 #71b; R2-105648.

ITRI: "Considerations on the remaining issues of PHR"; Considerations on the Remaining Issues of PHR V2; 3GPP TSG-RAN WG2 #71; Aug. 23-27, 2010; R2-104893; Madrid, Spain.

TSG RAN WG1; "LS on the Reference Format on Virtual PHR"; Oct. 11-15, 2010; 3GPP TSG-RAN WG1 #62b; R1-105820.

METHOD AND APPARATUS FOR CONFIGURING POWER HEADROOM INFORMATION IN MOBILE COMMUNICATION SYSTEM SUPPORTING CARRIER AGGREGATION

CROSS-REFERENCE TO RELATED APPLICATIONS

This application is a continuation application of a prior application Ser. No. 14/591,409, filed on Jan. 7, 2015, which is a continuation application of a prior application Ser. No. 13/206,779, filed on Aug. 10, 2011, which has issued as U.S. Pat. No. 8,954,106 on Feb. 10, 2015 and which claimed the benefit under 35 U.S.C. §119(e) of a provisional patent application filed on Aug. 10, 2010 in the United States Patent Office and assigned Ser. No. 61/372,452, of a provisional patent application filed on Aug. 16, 2010 in the United States Patent Office and assigned Ser. No. 61/374,160, of a provisional patent application filed on Sep. 16, 2010 in the United States Patent Office and assigned Ser. No. 61/383,437, of a provisional patent application filed on Oct. 4, 2010 in the United States Patent Office and assigned Ser. No. 61/389,476, of a provisional patent application filed on Oct. 12, 2010 in the United States Patent Office and assigned Ser. No. 61/392,436, and of a provisional patent application filed on Nov. 5, 2010 in the United States Patent Office and assigned Ser. No. 61/410,493, and under 35 U.S.C. §119(a) of a Korean patent application filed on Jul. 26, 2011 in the Korean Intellectual Property Office and assigned Serial No. 10-2011-0074076, the entire disclosures of each of which are hereby incorporated by reference.

BACKGROUND OF THE INVENTION

1. Field of the Invention

The present invention relates to a mobile communication system supporting carrier aggregation. More specifically, the present invention relates to method and apparatus for configuring Power Headroom Report (PHR) of a User Equipment (UE) efficiently in a mobile communication system supporting carrier aggregation.

2. Description of the Related Art

Mobile communication systems developed to provide subscribers with voice communication services on the move. With the rapid advance of technology, mobile communication systems have evolved to support high speed data communication services as well as the standard voice communication services.

Recently, Long Term Evolution (LTE) is under development as the next generation mobile communication system of the 3$^{rd}$ Generation Partnership Project (3GPP). The LTE system is a technology for realizing high-speed packet-based communication at about 100 Mbps. A discussion is being held on several schemes for LTE, including one scheme for reducing the number of nodes located in a communication path by simplifying a configuration of the network, and another scheme for maximally approximating wireless protocols to wireless channels.

Unlike voice services, resources for data services are allocated according to the data amount to be transmitted and channel condition. Accordingly, in a wireless communication system such as a cellular communication system, a scheduler manages resource allocation according to the resource amount, channel condition, and data amount. This is also the case in the LTE system, in which the scheduler located in the base station manages and allocates the radio resource.

Recently, LTE-Advanced (LTE-A) is actively being discussed as an evolution of the LTE with new techniques to increase data rater. Carrier aggregation is one of the representative techniques that are newly adopted in LTE-A. Unlike the data communication of the related art, in which a User Equipment (UE) uses a single uplink carrier and a single downlink carrier, carrier aggregation enables the UE to use multiple uplink and/or downlink carriers. Since the uplink transmission power determination algorithm is designed for the UE operating with one uplink carrier and one downlink carrier, it is difficult to apply the transmission power determination process for uplink transmission power determination of the UE supporting carrier aggregation. There is a need to define a procedure and method for configuring a Power Headroom Report (PHR) of the UE supporting carrier aggregation.

SUMMARY OF THE INVENTION

Aspects of the present invention are to address at least the above-mentioned problems and/or disadvantages and to provide at least the advantages described below. Accordingly, an aspect of the present invention is to provide a method and apparatus for configuring a Power Headroom Report (PHR) of a User Equipment (UE) efficiently in the mobile communication system supporting carrier aggregation. An aspect of the present invention is to configure PHR for reporting the Power Headroom (PH) for individual aggregated carriers.

In accordance with an aspect of the present invention, a method for configuring a Power Headroom Report (PHR) in a mobile communication system supporting carrier aggregation is provided. The method includes generating a header including a Logical Channel IDentifier (LCID) for identifying an extended PHR and L indicating a length of the extended PHR, and inserting Power Headrooms (PHs) of multiple activated carriers into the extended PHR of one of the carriers.

In accordance with another aspect of the present invention, an apparatus for configuring a PHR in a mobile communication system supporting carrier aggregation is provided. The apparatus includes a PH calculator for calculating PHs of a plurality of activated carriers, and a controller for generating a header including LCID for identifying extended PHR and L indicating a length of the extended PHR and for inserting the PHs into the extended PHR of one of the carriers.

In accordance with another aspect of the present invention, a method for receiving a PHR in a mobile communication system is provided. The method includes receiving a header including an LCID for identifying extended PHR and L indicating a length of the extended PHR, and receiving the extended PHR, and identifying PHs of multiple activated carriers inserted in the extended PHR.

In accordance with another aspect of the present invention, an apparatus for receiving a PHR in a mobile communication system is provided. The apparatus includes a transceiver for receiving a header including an LCID for identifying extended PHR and L indicating length of the extended PHR, and for receiving the extended PHR, and a controller for identifying PHs of multiple activated carriers inserted in the extended PHR.

In accordance with another aspect of the present invention, method of generating a Power Headroom Report (PHR) in a mobile communication system supporting carrier aggregation is provided. The method includes receiving a PHR trigger, determining whether to generate an extended PHR based on the PHR trigger, and when an extended PHR is to be generated, configuring an extended PHR, the extended PHR comprising a header including a Logical Channel IDentifier (LCID) identifying the extended PHR and a length of the extended PHR, and a payload including Power Headrooms (PHs) of multiple activated carriers.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus for a User Equipment (UE) to configure a Power Headroom Report (PHR) efficiently in a mobile communication system supporting carrier aggregation. An exemplary mobile communication system to which exemplary embodiments of the present invention may be applied is described below with reference to FIGS. 1 to 3. The description is directed to a Long Term Evolution (LTE) system, but other wireless communications systems may also be employed.

Figure 1:
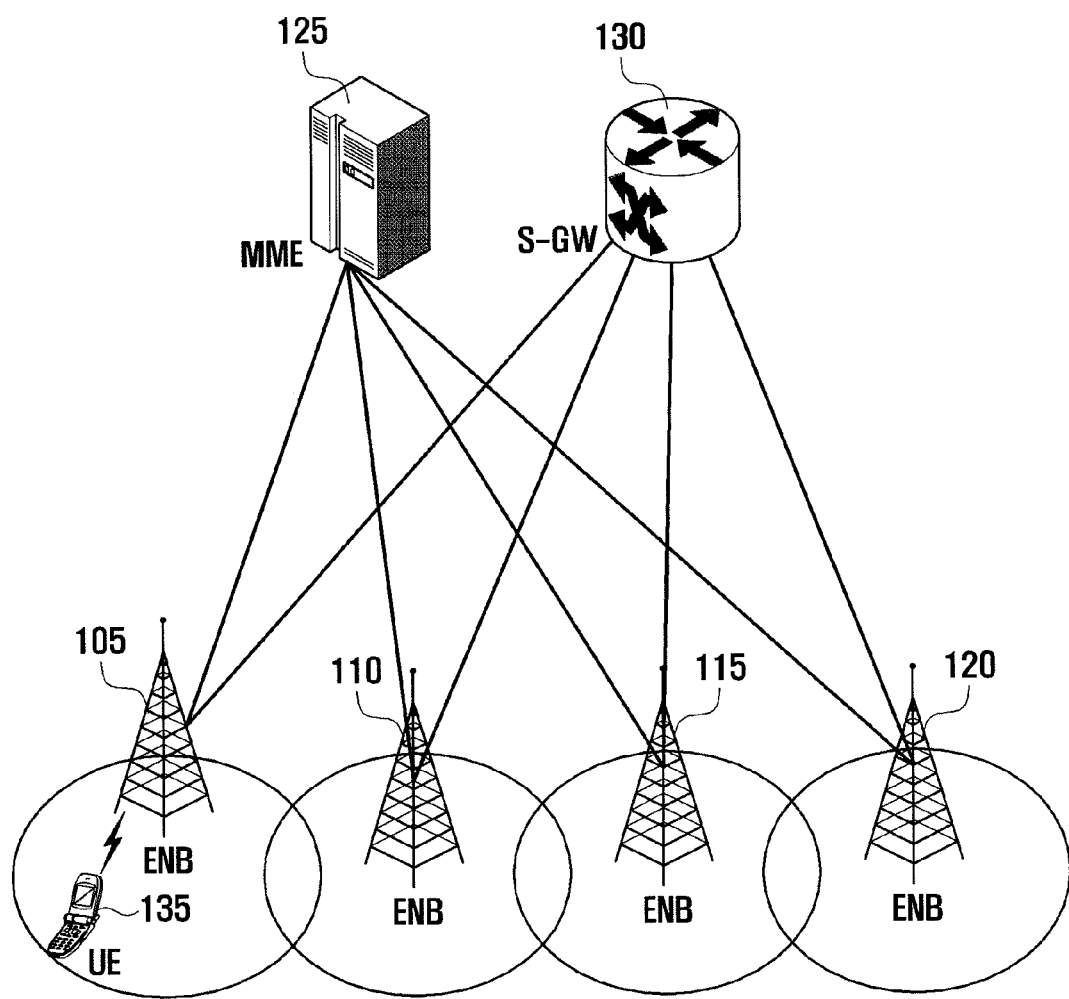
FIG. 1 is a diagram illustrating an architecture of a mobile communication system according to an exemplary embodiment of the present invention.

FIG. 1 is a diagram illustrating the architecture of a mobile communication system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The UE 135 connects to an external network via eNBs 105, 110, 115, and 120 and the S-GW 130.

The eNBs 105, 110, 115, and 120 correspond to legacy node Bs of Universal Mobile Communications System (UMTS). The eNBs 105, 110, 115, and 120 allow the UE establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information of the UEs. In order to implement the data rate of up to 100 Mbps, the LTE system adopts Orthogonal Frequency Division Multiplexing (OFDM) as a radio access technology. The LTE system adopts Adaptive Modulation and Coding (AMC) to determine the modulation scheme and channel coding rate according to the channel condition of the UE.

S-GW 130 is an entity to provide data bearers so as to establish and release data bearers under the control of the MME 125. MME 125 is responsible for various control functions and connected to a plurality of eNBs 105, 110, 115, and 120.

Figure 2:
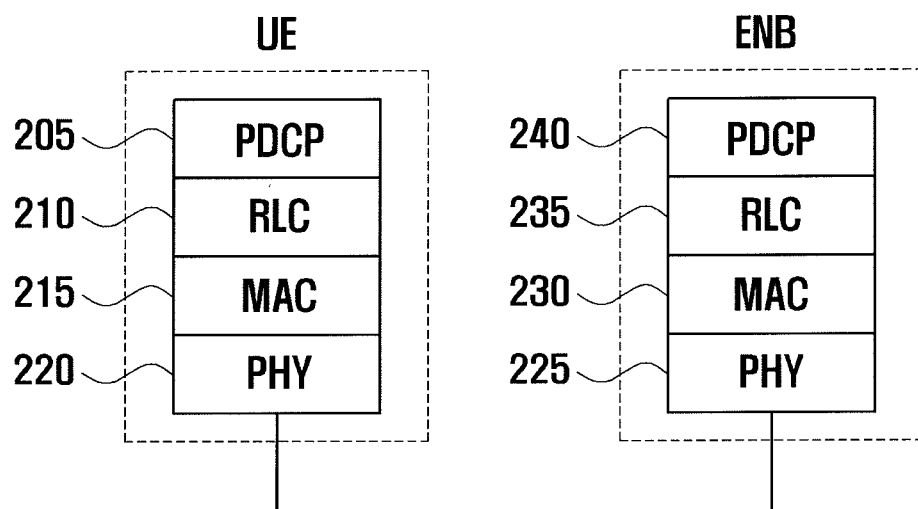
FIG. 2 is a diagram illustrating a protocol stack of a mobile communication system according to an exemplary embodiment of the present invention.

FIG. 2 is a diagram illustrating a protocol stack of a mobile communication system according to an exemplary embodiment of the present invention.

Referring to FIG. 2, the protocol stack of the LTE system includes Packet Data Convergence Protocol (PDCP) layer 205 and 240, Radio Link Control (RLC) layer 210 and 235, Medium Access Control (MAC) layer 215 and 230, and Physical (PHY) layer 220 and 225. The PDCP layer 205 and 240 is responsible for Internet Protocol (IP) header compression/decompression. The RLC layer 210 and 235 is responsible for segmenting the PDCP Protocol Data Unit (PDU) into segments in a size appropriate for Automatic Repeat Request (ARQ) operation. The MAC layer 215 and 230 is responsible for establishing connections to a plurality of RLC entities so as to multiplex the RLC PDUs into MAC PDUs and demultiplex the MAC PDUs into RLC PDUs. The PHY layer 220 and 225 performs channel coding on the MAC PDU and modulates the MAC PDU into OFDM symbols to transmit over a radio channel or performs demodulating and channel-decoding on the received OFDM symbols and delivers the decoded data to a higher layer. The data input to a protocol entity is referred to as Service Data Unit (SDU), and the data output by the protocol entity is referred to as a PDU.

Figure 3:
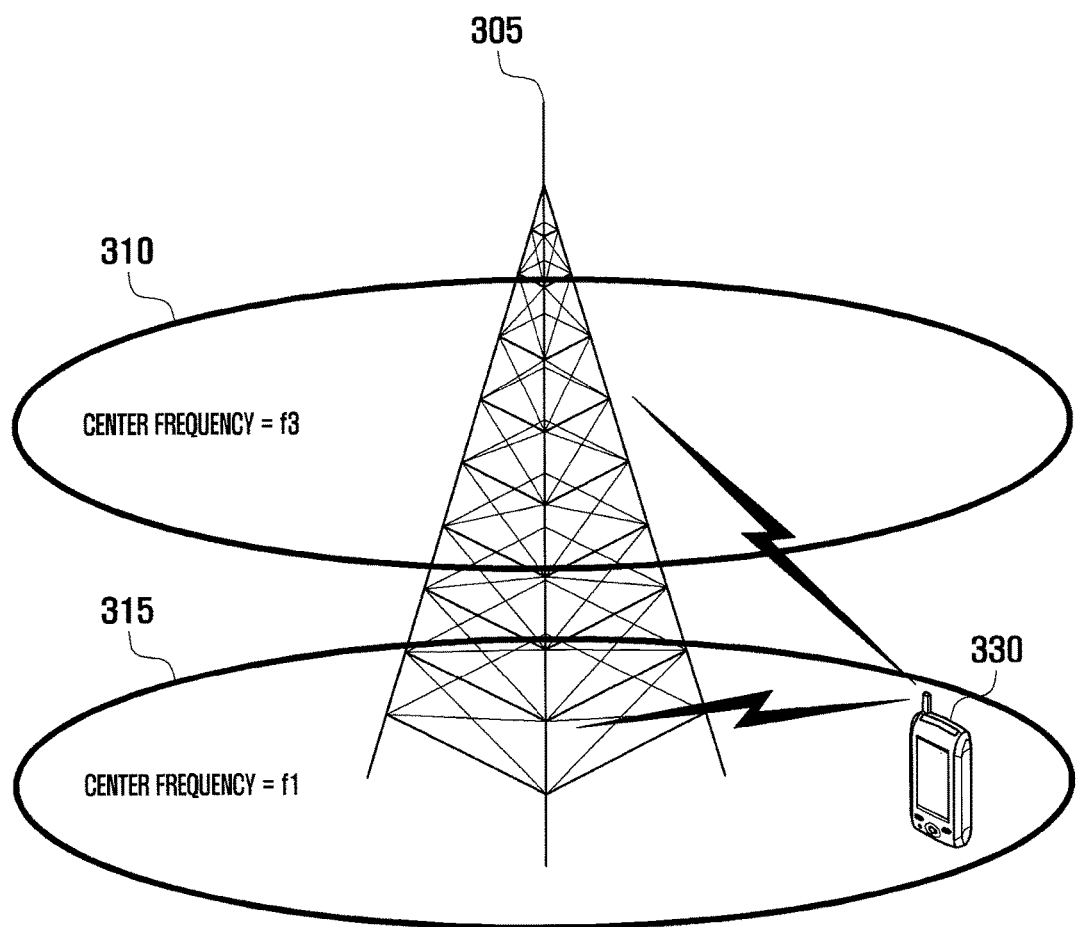
FIG. 3 is a diagram illustrating an exemplary situation of carrier aggregation in a mobile communication system according to an exemplary embodiment of the present invention.

FIG. 3 is a diagram illustrating an exemplary situation of carrier aggregation in a mobile communication system according to an exemplary embodiment of the present invention.

Referring to FIG. 3, an eNB typically uses multiple carriers transmitted and received in different frequency bands. For example, the eNB 305 may be configured to use the carrier 315 with center frequency f1 and the carrier 3210 with center frequency f3. If carrier aggregation is not supported, the UE 330 transmits/receives data using just one of the carriers 310 and 315. However, the UE 330 having the carrier aggregation capability may transmit/receive data using both the carriers 310 and 315.

The eNB may increase the amount of the resource to be allocated to the UE having the carrier aggregation capability according to the channel condition of the UE so as to improve the data rate of the UE. If a cell is configured with one downlink carrier and one uplink carrier, the carrier aggregation can be understood as if the UE communicates data via multiple cells. With the use of carrier aggregation, the maximum data rate increases in proportion to the number of aggregated carriers.

In order to mitigate interference, the uplink transmission power may be maintained below an appropriate level. For this purpose, the UE calculates the uplink transmission power using a predetermined function and performs uplink transmission at the calculated uplink transmission power. For example, the UE calculates the required uplink transmission power value by inputting the input values such as the scheduling information including resource amount and Modulation and Coding Scheme (MCS) allocated to the UE and information necessary for estimating the channel condition such as path loss, and performs uplink transmission by applying the calculated uplink transmission power value. The available uplink transmission power value of the UE is limited to the maximum transmission power value of the UE such that when the calculated transmission power value exceeds the maximum transmission power value the UE performs the uplink transmission at the maximum transmission power. In this case, the uplink transmission power is not enough, resulting in uplink transmission quality degradation. Accordingly, the eNB may perform scheduling such that the required transmission power does not exceed the maximum transmission power. However, since a few parameters such as path loss is not determined by the eNB, the UE reports its Power Headroom (PH) value to the eNB by means of a PHR.

Several factors influence PH, including 1) allocated transmission resource amount, 2) MCS to be applied to uplink transmission, 3) Path Loss (PL) of the related downlink carrier, and 4) accumulated value of transmission power control command. The Path Loss and accumulated transmission power control command value are variable according to the uplink carrier such that, when multiple uplink carriers are aggregated, the transmission of PHR may be configured per carrier. However, in order to transmit the PHR efficiently, it can be advantageous to report the PHs of all the uplink carriers on one uplink carrier. Depending on the management policy, it may be necessary to transmit the PH of the carrier on which no Physical Uplink Shared Channel (PUSCH) transmission actually takes place. In this case, it may be more efficient to report the PHs of the multiple uplink carriers on a single uplink carrier. For this purpose, the PHR may be extended. The multiple PHs to be contained in a PHR may be arranged in a predetermined order.

Figure 4:
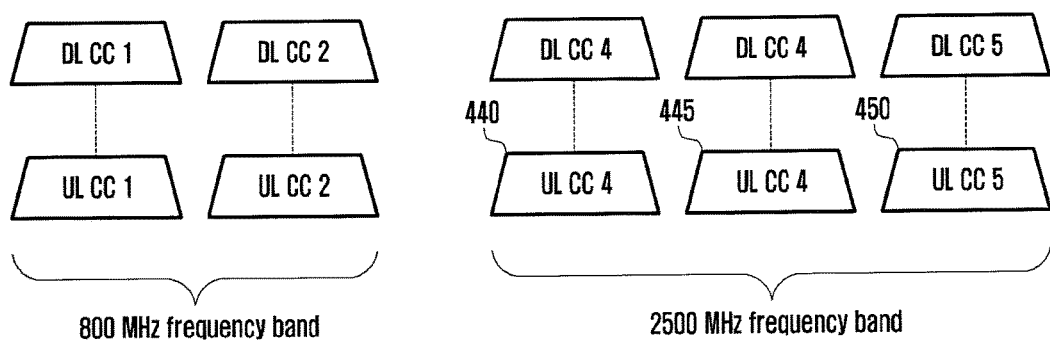
FIG. 4 is a conceptual diagram illustrating a principle of carrier aggregation for use in a mobile communication according to an exemplary embodiment of the present invention.

FIG. 4 is a conceptual diagram illustrating a principle of carrier aggregation for use in the mobile communication according to an exemplary embodiment of the present invention.

Referring to FIG. 4, 5 uplink carriers may be aggregated for the UE, and one of the aggregated carriers may be selected to transmit the PHs for the 5 uplink carriers. For example, when three uplink carriers 440, 445, and 450 are aggregated for the UE, a PHR can be configured to carry the PHs for the three uplink carriers.

A PHR is triggered when the path loss of the connected downlink carrier is equal to or greater than a predetermined threshold value, a prohibit PHR time expires, or a predetermined time period elapses after the last PHR generation. Once PHR has triggered, the UE waits until the time available for the uplink transmission arrives, e.g., the time for which the uplink transmission resource is allocated, rather than transmit the PHR immediately. This is because PHR is not time-sensitive information. The UE transmits PHR at the first uplink transmission. PHR is the MAC layer control information and has the length of 8 bits. The first two bits of the PHR are reserved for future use, and the remaining 6 bits are used to indicate the value in the range between −23 dB and 40 dB as the available transmit power of the UE.

Figure 5:
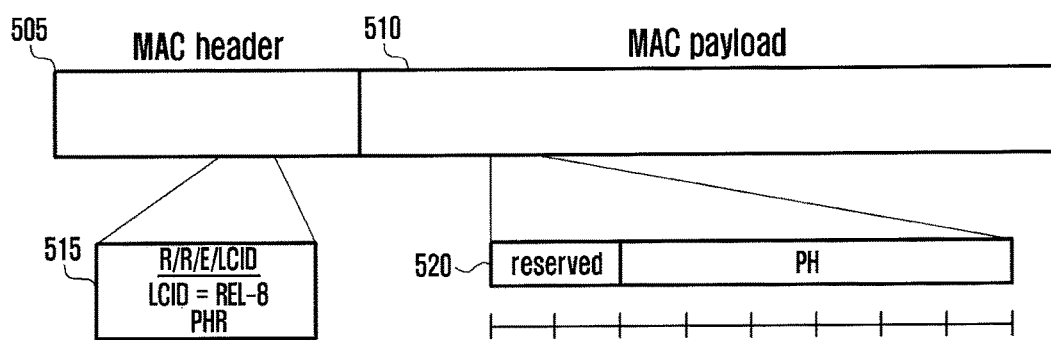
FIG. 5 is a diagram illustrating a format of a typical Power Headroom Report (PHR) for use in a mobile communication system according to an exemplary embodiment of the present invention.

FIG. 5 is a diagram illustrating the format of a typical PHR for use in the mobile communication system according to an exemplary embodiment of the present invention.

Referring to FIG. 5, a MAC PDU includes a header 505 and a payload 510. The header 505 includes a plurality of sub-headers, and each sub-header contains information on the data carried in the payload 510, i.e. the ID (LCID) indicating the type of the data.

PHR 520 is also transmitted to the eNB in MAC PDU. In order to transfer the PHR 520, the header 505 includes a sub-header 515 related to the PHR 520. The sub-header includes an LCID indicating the PHR 520. PHR 520 has a fixed value such that the sub-header 515 about the PHR 520 contains no size information about the PHR 520. Along with the sub-header 515, the payload 510 includes 1-byte PHR 520. The first two bits of the PHR 520 are reserved for future use, and the remaining 6 bits are used to indicate the value in the range between −23 dB and 40 dB. This indicates the PH value of the UE.

In the mobile communication system supporting carrier aggregation, if the PHs of multiple serving cells are to be reported, the UE aggregates the PHs into one PHR. By transmitting the PHs of multiple serving cells aggregated in one PHR, it is possible to reduce the signaling overhead as compared to the case where the PHs of the multiple carriers are transmitted separately, and the eNB can acquire the PH for the carrier carrying one PUSCH.

Figure 6A:
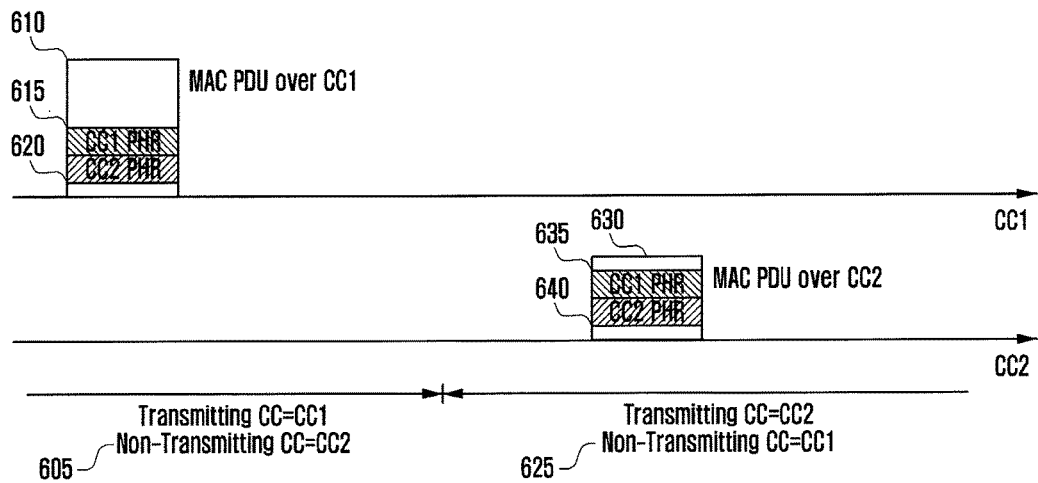
FIGS. 6A and 6B are diagrams illustrating a concept of a PHR configuration according to an exemplary embodiment of the present invention.
Figure 6B:
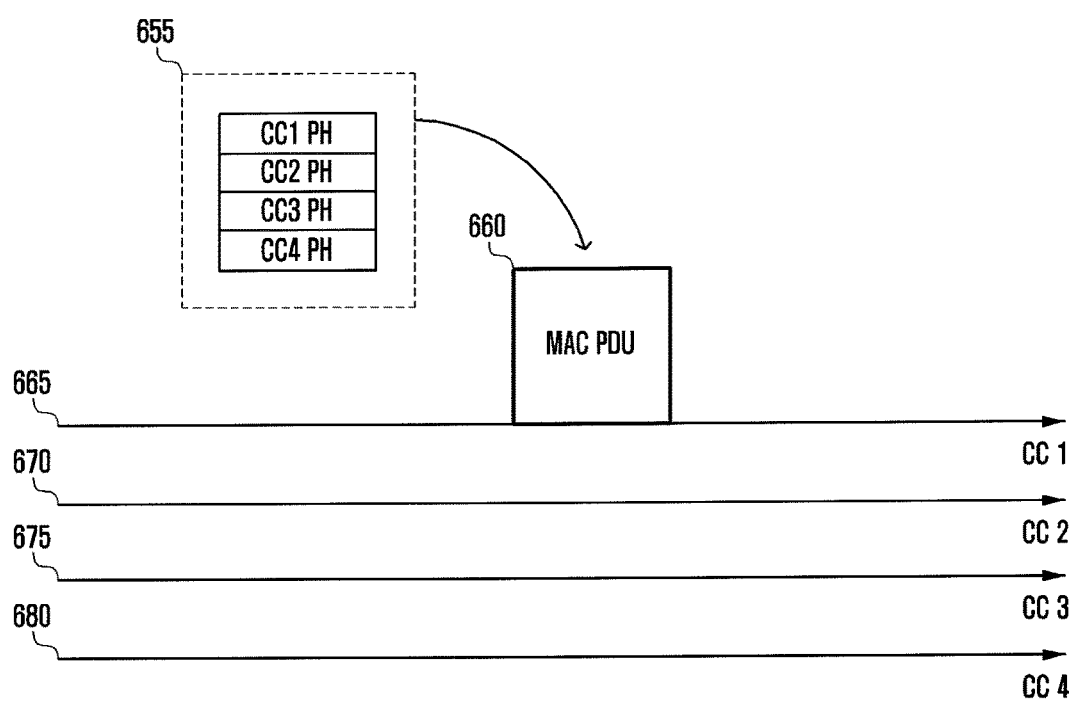

FIGS. 6A and 6B are diagrams illustrating a concept of the PHR configuration according to an exemplary embodiment of the present invention.

Referring to FIG. 6A, a scenario is shown in which each of two serving cells CC1 and CC2 transmits the PHs of both the serving cells. In the time duration 605 for which PUSCH transmission occurs in CC1 but not in CC2, the UE can transmit MAC PDU 610 containing the CC1 PH 615 and CC2 PH 620. In the time duration 625 for which PUSCH transmission occurs in CC2 but not in CC1, the UE can transmit MAC PDU 630 containing the CC1 H 635 and CC2 PH 640. Although no PUSCH is transmitted, the eNB can trigger PHR to acquire the path loss information on a specific uplink carrier.

Referring FIG. 6B, when using four CCs 665, 670, 675, and 680, the UE can transmit the PHs of the CC2 670, CC3 675, and CC4 680 as well as CC1 665. The MAC PDU 660 transmitted in the CC1 665 includes one PHR 655 containing all the PHs of the CC1 665, CC2 660, CC3 675, and CC4 680.

Methods for configuring a plurality of PHs efficiently into one PHR according to exemplary embodiments of the present invention are described below.

<First Exemplary Embodiment>

In the first embodiment, an extended PHR includes PH information for a plurality of carriers, and the PH information of each carrier is selectively included. Accordingly, the extended PHR varies in size according to the situation. In the first embodiment, a new PHR format is defined according to the aforementioned characteristics.

With the introduction of the new extended PHR format in addition to the general PHR format, a new LCID is defined to indicate the extended PHR format for the discrimination purpose. The newly defined PHR format is referred to as REL-10 PHR. The extended PHR has a variable length such that a value L is added to indicate the length of the extended PHR.

The serving cell of the primary carrier (PCell) may support type 2 PH or not depending on whether PUSCH and PUCCH are transmitted simultaneously. The PHs of activated Second Cells are included. Since the extended PHR has a variable length, the sub-header includes a value L indicating the length of the PHR. Unlike the PCell, the Serving Cell (SCell) of a secondary carrier does not support simultaneous transmission of PUSCH and PUCCH and thus there is no Type 2 PH. The PH information of individual carriers is arranged in order of Type 2 PH of PCell→Type 1 PH of PCell→PHs of activated Second Cells in ascending order along consecutive bytes. According to exemplary embodiments of the present invention, since the Type 2 PH exists in PCell and Type 1 PH is used to interpret the Type 2 PH, the PH of the PCell is arranged at the beginning.

Type 2 PH is applied when PUSCH and PUCCH are used simultaneously in uplink. The Type 2 PH of PCell can be defined as follows:

$$PH_{Type\ 2} = P_{cmax} - P_{PUSCH} - P_{PUCCH}$$

When only PUSCH is used in uplink, the Type 1 PH of the PCell and SCell is applied and defined as follows:

$$PH_{Type1} = P_{cmax} - P_{PUSCH}$$

The UE receiving the extended PHR can acquire the information on the power headroom for PUSCH transmission and PUCCH transmission in the PCell using the Type 2 PH and Type 1 PH of the PCell first and then process the same type PHs, i.e. Type 1 PHs to reduce processing load.

Figure 7:
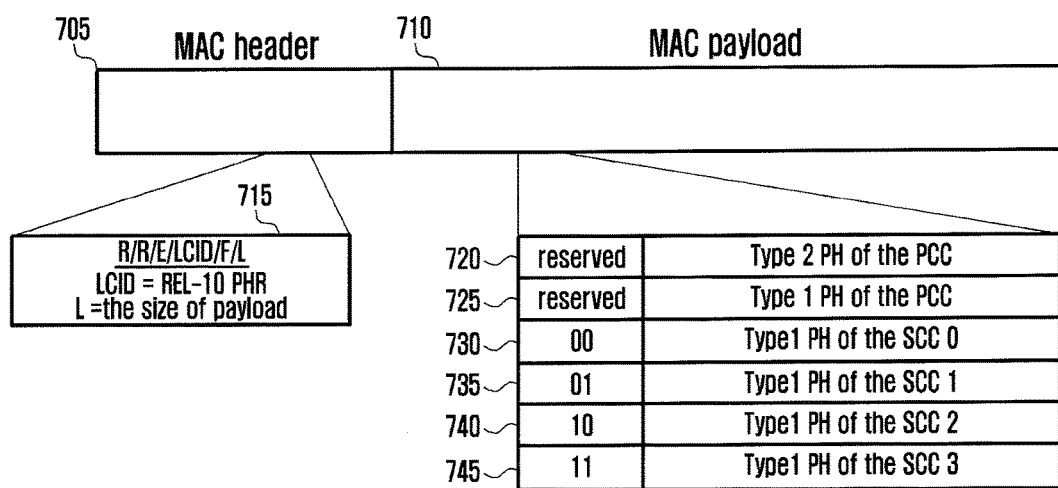
FIG. 7 is a diagram illustrating a configuration of a PHR according to a first exemplary embodiment of the present invention.

FIG. 7 is a diagram illustrating a configuration of the PHR according to a first exemplary embodiment of the present invention.

Referring to FIG. 7, the MAC header 705 includes the sub-header for the extended PHR. The sub-header 715 includes the LCID indicating inclusion of the extended PHR in the MAC payload 710 and the value L indicating the length of the PHR. The extended PHR is composed of the PCell Type 2 PH 720, PCell Type 1 PH 725, and SCell PHs 730, 735, 740, and 745 in the MAC payload 710. In the consecutive bytes, the PH information of each carrier is arranged in ascending order of Type 2 PH of PCell→Type 1 PH of PCell→PH of $0^{th}$ SCell→PH of $1^{st}$ SCell→PH of $3^{rd}$ SCell.

Figure 8:
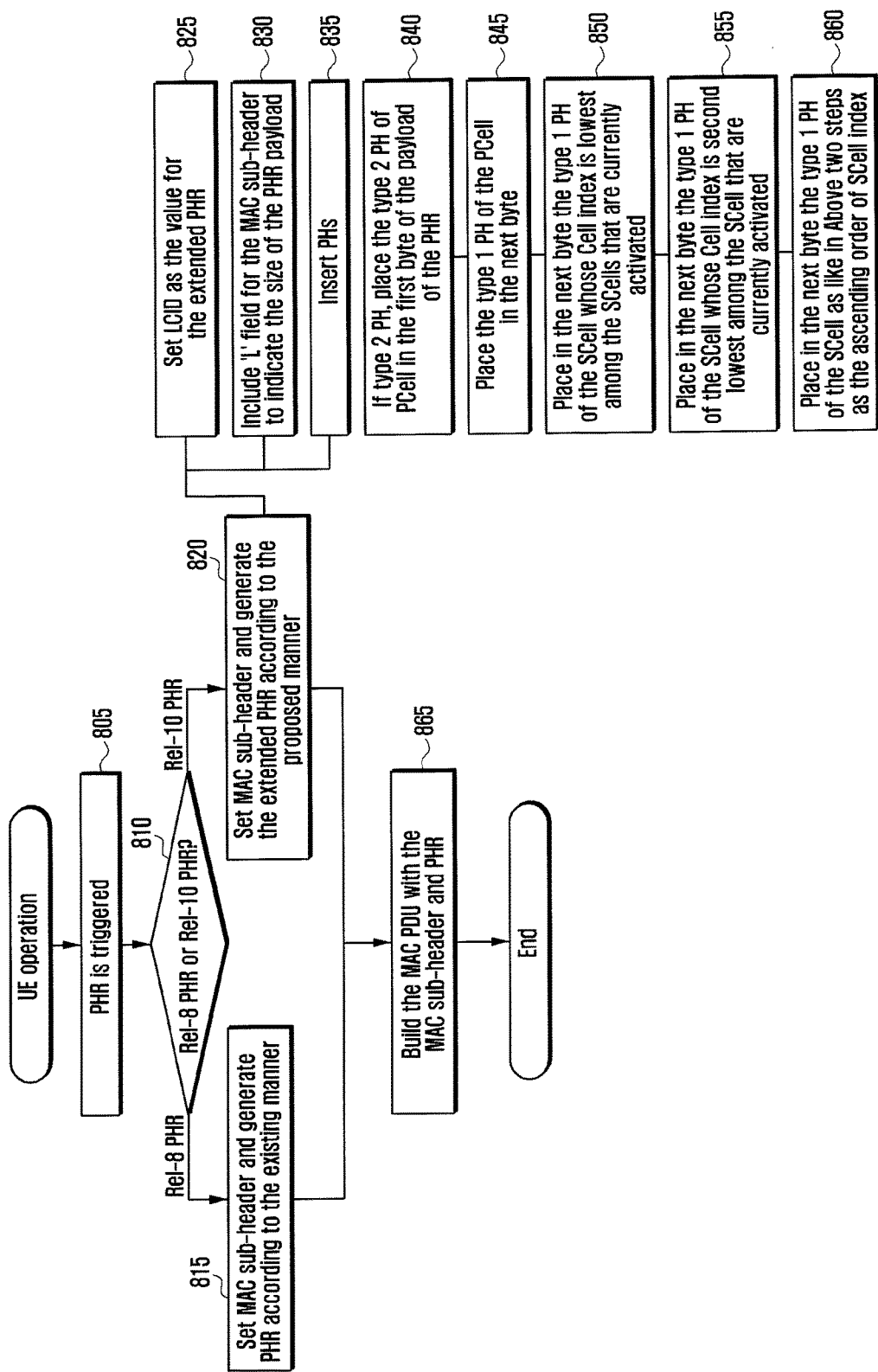
FIG. 8 is a flowchart illustrating a method for configuring PHR of a User Equipment (UE) according to the first exemplary embodiment of the present invention.

FIG. 8 is a flowchart illustrating a method for configuring PHR of the UE according to the first exemplary embodiment of the present invention.

Referring to FIG. 8, the UE detects a trigger of PHR in step 805. If the PHR trigger is detected, the UE determines whether the triggered PHR is the normal PHR or the extended PHR for PHs of multiple carriers in step 810. If the triggered PHR is the normal PHR, the UE configures the sub-header and PHR in a normal format in step 815. If the triggered PHR is the extended PHR, the UE configures the sub-header and PHR in a format according to an exemplary embodiment of the present invention in step 820. After configuring the PHR in corresponding format, the UE encapsulates the sub-header and PHR in a MAC PDU in step 865.

Steps 825 and 830 are a process for configuring the sub-header. The UE sets a newly defined LCID to indicate that the information contained in the payload is the extended PHR information in step 825. The UE sets the value L indicating the length of the extended PHR in step 830. The UE configures the PH information in the payload in step 835.

Step 830 may include steps 840 to 860 for arranging the PHs of the respective carriers. If the PUSCH and PUCCH are transmitted simultaneously, the PCell Type 2 PH should be reported such that the UE inserts the PCell Type 2 PH in the first byte in step 840. The UE inserts the PCell Type 1 PH at the position following the PCell Type 2 PH in step 845. The UE inserts the PH of the SCell having the lowest SCell index in step 850. The UE inserts the PH of SCell having the next lowest SCell index in step 855. Afterward, the UE continues inserting the PHs of the SCell in ascending order of SCell index in step 860.

<Second Exemplary Embodiment>

In the second embodiment, the PH information for each carrier is selectively required. Accordingly, the extended PHR varies in length according to the situation. The value L indicating the length of the PHR is defined in the PHR sub-header. It is possible to indicate the SCell in which PH information is transmitted among the activated Secondary Cells by adding a bitmap to the PHR in the payload. This helps transmit PH information more efficiently. The PHR sub-header includes the LCID newly introduced to identify the extended PHR.

The extended PHR is variable in length such that the information in the first byte on whether the PH information of individual carriers is transmitted enables an estimation of the length. The information is configured in the form of a bitmap so as to indicate the PH of PCell or Type 2 PH of PCell. Typically, it is assumed that the PH of PCell is always included and, in this case, there is no need to assign a bit for this purpose. Whether the PHs of Secondary Cells are included can be indicated in the bitmap. Unlike the Primary Cell, since PUSCH and PUCCH cannot be transmitted simultaneously in the secondary cell, only Type 1 PH exists. In the consecutive bytes, the PHs of the carries are arranged in order of Type 2 PH of PCell→Type 1 PH of PCell→PHs of Secondary Cells in ascending order or SCell index.

Figure 9:
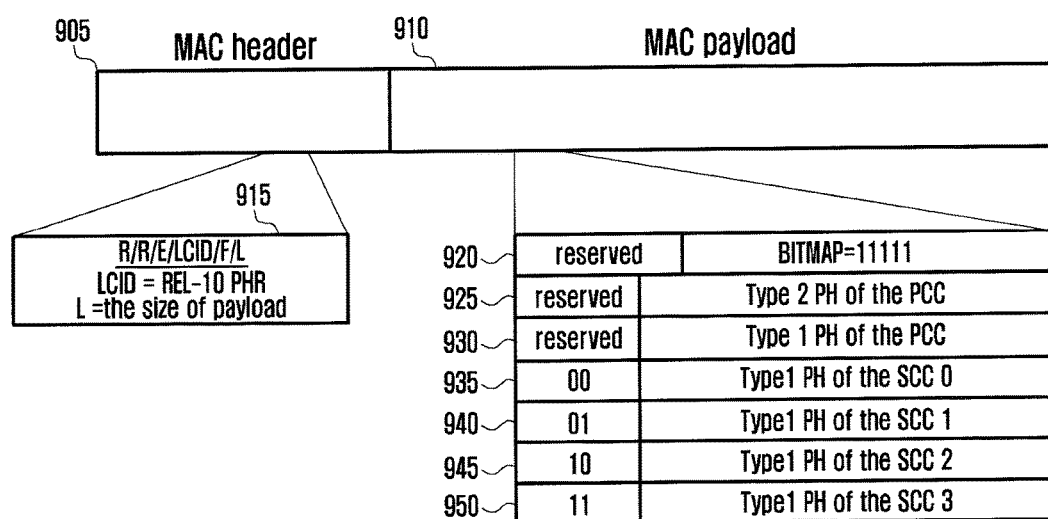
FIG. 9 is a diagram illustrating a configuration of a PHR according to a second exemplary embodiment of the present invention.

FIG. 9 is a diagram illustrating a configuration of the PHR according to a second exemplary embodiment of the present invention.

Referring to FIG. 9, the MAC header 905 includes the sub-header 915 for the extended PHR. The sub-header 915 includes the LCID indicating inclusion of the extended PHR in the MAC payload 910 and the value L indicating the length of the PHR. The extended PHR is contained in the MAC payload 910 and includes the bitmap 920, PCell Type 2 PH 925, PCell Type 1 PH 930, and SCell PHs 935, 940, 945, and 950. Assuming that the extended PHR always includes the PCell Type 1 PH, there is no need to allocate the bitmap separately. Since the PCell Type 2 PH can be included according to the situation, a bitmap for indicating the PCell Type 2 PH can be necessary but not mandatory. A bitmap is allocated to indicate whether the PHs of individual Secondary Cells exist. If the PCell Type 2 PH and the PHs for all the four activated Secondary Cells are included, 5 bits are necessary, and all the bits may be set to 1. In the consecutive bytes, the PH information of the individual carriers is arranged in ascending order of Type 2 PH of PCell→Type 1 PH of PCell→PH of $0^{th}$ SCell→PH of $1^{st}$ SCell→PH of $2^{nd}$ SCell→PH of $3^{rd}$ SCell.

Figure 10:
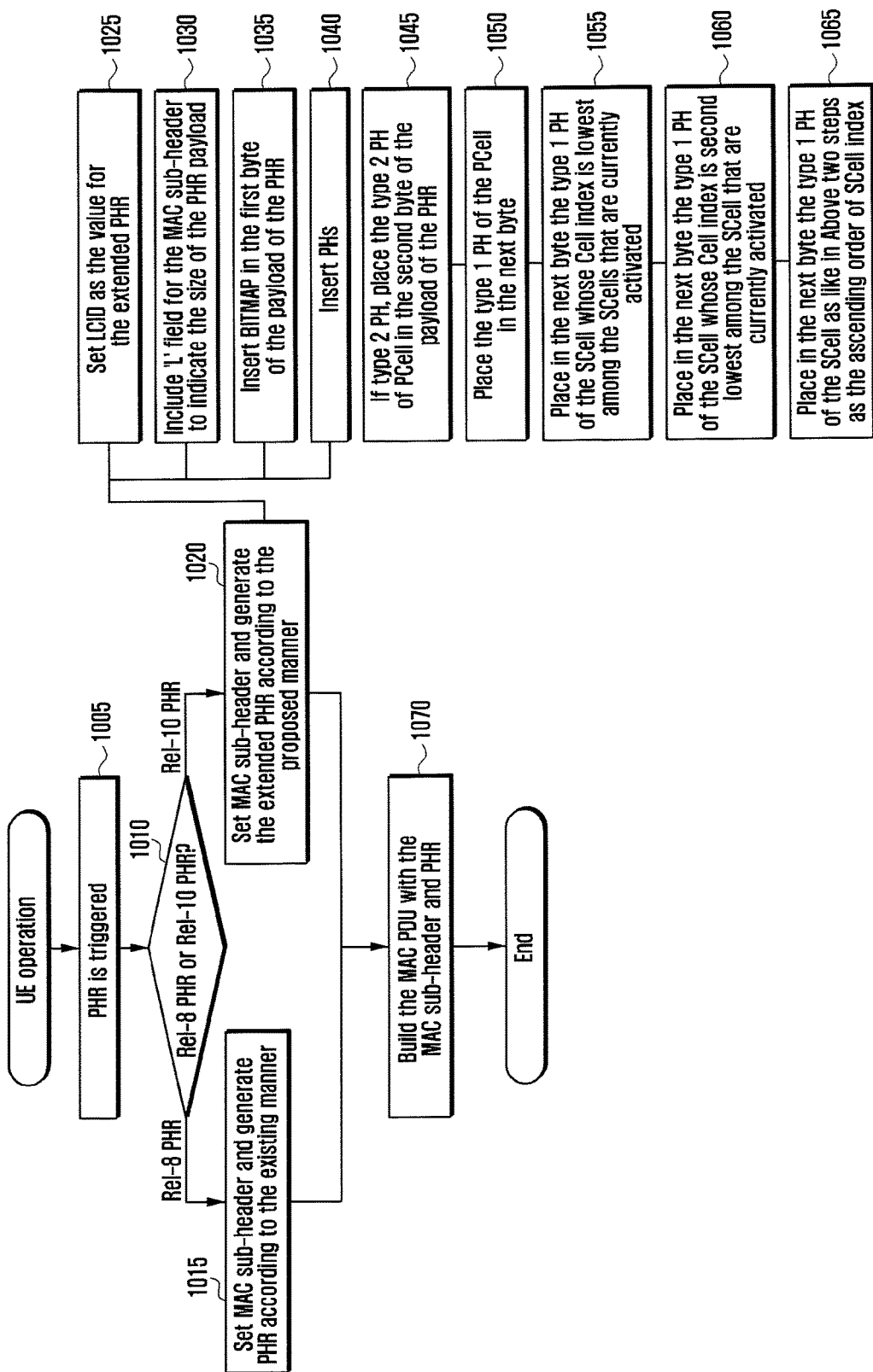
FIG. 10 is a flowchart illustrating a method for configuring PHR of the UE according to the second exemplary embodiment of the present invention.

FIG. 10 is a flowchart illustrating a method for configuring PHR of the UE according to the second exemplary embodiment of the present invention.

Referring to FIG. 10, the UE detect a trigger of PHR in step 1005. If the PHR trigger is detected, the UE determines whether the triggered PHR is the normal PHR or the extended PHR for PHs of multiple carriers in step 1010. If the triggered PHR is the normal PHR, the UE configures the sub-header and PHR in a normal format in step 1015. If the triggered PHR is the extended PHR, the UE configures the sub-header and PHR in a format proposed according to an exemplary embodiment of the present invention in step 1020. After configuring the PHR in corresponding format, the UE encapsulates the sub-header and PHR in a MAC PDU in step 1070.

Steps 1025 and 1030 are the process for configuring the sub-header. The UE sets a newly defined LCID to indicate that the information contained in the payload is the extended PHR information in step 1025. The UE sets the value L indicating the length of the extended PHR in step 1030. Steps 1035 and 1045 are the process for configuring the PH information in the payload. The UE places the bitmap information indicating the SCell in which PH information is transmitted among the activated SCell in the first byte of the PHR in step 1035. The UE places the PHs in order according to the bitmap information in step 1040.

Step 1040 may include steps 1045 to 1065 for arranging the PHs of the respective carriers. If the PUSCH and PUCCH are transmitted simultaneously in the uplink such that PCell Type 2 PH exists, the UE inserts the PCell Type 2 PH in the second byte following the first byte carrying the bitmap in step 1045. The UE inserts the PCell Type 1 PH in the next byte in step 1050. The UE inserts the PH of the SCell having the lowest SCell index in the next byte in step 1055. The UE inserts the PH of the SCell having the second lowest SCell index in the next byte in step 1060. The UE continues inserting the PHs of the Secondary Cells in ascending order of the SCell index in step 1065.

According to an exemplary embodiment of the present invention, the UE configures the extended PHR in the mobile communication system supporting carrier aggregation. The UE generates the MAC header including the PHR type identifier LCID for identifying the extended PHR and the parameter L indicating the length of the extended PHR. The UE arranges the PHs of a plurality of activated carriers into the PHR of one of the activated carriers. The extended PHR has several consecutive bytes, and the UE arranges the PHs in ascending order of the activated carriers in match with the bytes. The UE inserts the Type 1 PHs of the carriers in the PHR. The UE arranges Type 1 PH of Primary Cell first among the activated carriers and then the Type 1 PHs of the Secondary Cells in ascending order of the Scell index. If the PUCCH and PUSCH are transmitted simultaneously in the uplink, the UE may insert the Type 2 PH of the PCell first and then, in series, Type 1 PH of the PCell and Type 1 PHs of SCell in ascending order of SCell index. The UE may insert the bitmap indicating positions of the PHs of activated carriers in the extended PHR in the byte followed by the bytes of the PHs.

Figure 11:
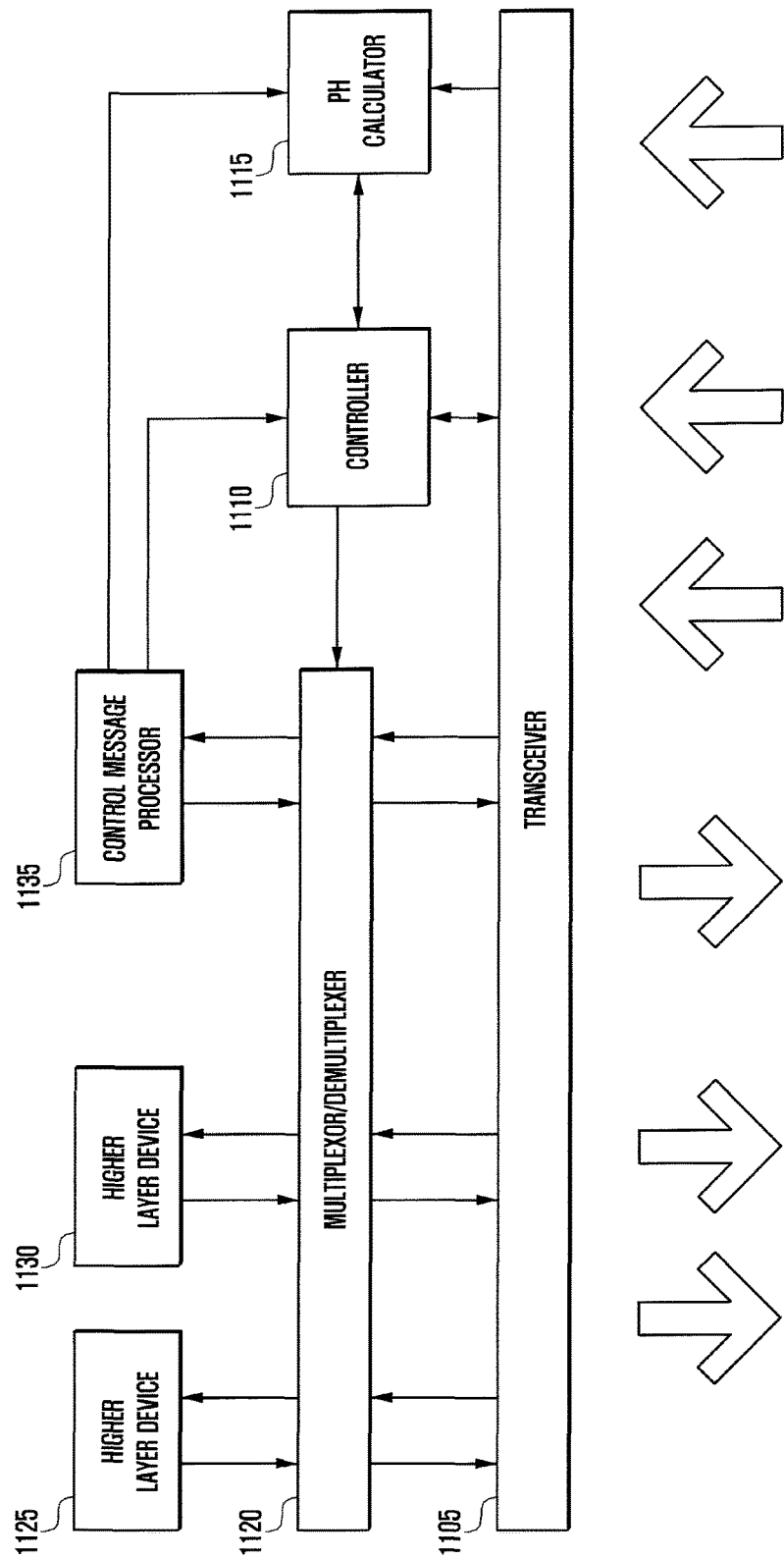
FIG. 11 is a block diagram illustrating a configuration of the PHR configuration apparatus of the UE according to an exemplary embodiment of the present invention.

FIG. 11 is a block diagram illustrating a configuration of a PHR configuration apparatus of a UE according to an exemplary embodiment of the present invention.

Referring to FIG. 11, the UE includes a transceiver 1105, a PH calculator 1115, a controller 1110, a multiplexer/demultiplexer 1120, a control message processor 1135, and various higher layer devices 1125 and 1130. The UE may also include other units not shown here for clarity, such as a display unit, input unit, or the like. Similarly, two or more of the above units may be integrated into a single component. While various units may be implemented in software, it would be understood that at least some units of the UE would be implemented at least partially as hardware units in order to carry out their functions.

The transceiver 1105 receives data and control signals in the downlink carrier and transmits data and control signals in the uplink carrier. If carrier aggregation is applied, the transceiver may transmit and receive the data and control signals over multiple aggregated subcarriers.

The PH calculator 1115 calculates the PH and sends the PH to the controller 1110 under the control of the controller 1110. If multiple carriers are aggregated, the PH calculator 1115 may calculate the PHs for the respective aggregated carriers.

The controller 1110 controls the multiplexer/demultiplexer 1120 to generate MAC PDUs according to the control signal received via the transceiver 1105, e.g., the scheduling information indicated in the uplink grant. The controller 1110 may also detect a PHR trigger to control the PH calculator 1115 to calculate the PH when the PHR trigger is detected. The PHR trigger may be determined according to the PHR parameter received from the control message processor 1135. The controller 1110 generates the PHR with the PHs provided by the PH calculator 1115 and transfers the PHR to the multiplexer/demultiplexer 1120. If multiple carriers are aggregated, the controller 1110 may generate the extended PHR. The controller 1110 may generate the header including the LCID for identifying the extended PHR and the parameter L indicating the length of the extended PHR. The controller 1110 may also configure the PHs of the activated carriers into an extended PHR in one of the activated carriers. The controller 1110 encapsulates the header and extended PHR into a MAC PDU.

The multiplexer/demultiplexer 1120 multiplexes the data from the higher layer devices 1125 and 1130 and/or control message processor 1135 and demultiplexes the data received by the transceiver 1105 to the higher layer devices 1125 and 1130 and/or the control message processor 1135.

The control message processor 1135 processes the control message transmitted by the network and takes an appropriate action. The control message processor 1135 forwards the PHR parameter carried in the control message to the controller 1110 or the information on the newly activated carriers to the transceiver 1105 to set the carriers. The higher layer devices 1125 and 1130 may be implemented for respective services so as to deliver the data generated by the user service such as FTP and VoIP to the multiplexer/demultiplexer 1120 or process and deliver the data from the multiplexer/demultiplexer 1120 to service applications of the higher layer.

If the user generates the extended PHR as described above, the eNB uses the extended PHR to determine the uplink transmission power. The eNB includes a transceiver and a controller. The transceiver can receive header including the LCID for identifying the extended PHR and the parameter L indicating the length of the extended PHR and the extended PHR over one of the multiple aggregated carriers. The controller identifies the PHs of the multiple carriers that are contained in the extended PHR. The controller also can determine the uplink transmit power according to the PHs of individual carriers.

As described above, the PHR configuration method and apparatus for a mobile communication system supporting carrier aggregation enables efficient configuration of the PHR. If multiple carriers are aggregated, the PHR configuration method and apparatus according to exemplary embodiments of the present invention may configure the PHs of the multiple carriers into a PHR, whereby it is possible to determine the uplink transmission power more efficiently.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by a terminal in a mobile communication system, the method comprising:
   generating a medium access control protocol data unit (MAC PDU) including a header and an extended power headroom report (PHR), the header including a logical channel identifier (LCID) for identifying the extended PHR; and
   transmitting the MAC PDU to a base station,
   wherein the extended PHR includes one or more power headrooms (PHs) and a bitmap, the bitmap indicating whether at least one PH for at least one secondary cell is reported.

2. The method of claim 1, wherein the header further includes a length of the extended PHR.

3. The method of claim 1, wherein information on PHs for a primary cell and at least one secondary cell reported in the extended PHR is included in ascending order based on a cell index.

4. The method of claim 3, wherein if simultaneous transmission of control channel and data channel is configured, the information on the PH for the primary cell includes information on a type II PH and information on a type I PH, and the information on the type II PH is followed by the information on the type I PH.

5. The method of claim 3, wherein information on a type I PH of the primary cell is followed by information on a type I PH of the at least one secondary cell reported in the extended PHR.

6. A terminal in a mobile communication, the terminal comprising:
   at least one processor configured to generate a medium access control protocol data unit (MAC PDU) including a header and an extended power headroom report (PHR), the header including a logical channel identifier (LCID) for identifying the extended PHR; and
   a transmitter for transmitting the MAC PDU to a base station,
   wherein the extended PHR includes one or more power headrooms (PHs) and a bitmap, the bitmap indicating whether at least one PH for at least one secondary cell is reported.

7. The terminal of claim 6, wherein the PHs are included in ascending order of indices of the activated serving cells.

8. The terminal of claim 6, wherein information on PHs for a primary cell and at least one secondary cell reported in the extended PHR is included in ascending order based on a cell index.

9. The terminal of claim 8, wherein if simultaneous transmission of control channel and data channel is configured the information on the PH for the primary cell includes information on a type II PH and information on a type I PH, and the information on the type II PH is followed by the information on the type I PH.

10. The terminal of claim 8, wherein information on a type I PH of the primary cell is followed by information on a type I PH of the at least one secondary cell reported in the extended PHR.

11. A method by a base station in a mobile communication system, the method comprising:
    receiving a medium access control protocol data unit (MAC PDU) including a header and an extended power headroom report (PHR), the header including a logical channel identifier (LCID) for identifying the extended PHR; and
    identifying power headrooms (PHs) included in the PHR,
    wherein the extended PHR includes one or more power headrooms (PHs) and a bitmap, the bitmap indicating whether at least one PH for at least one secondary cell is reported.

12. The method of claim 11, wherein the header further includes a length of the extended PHR.

13. The method of claim 11, wherein information on PHs for a primary cell and at least one secondary cell reported in the extended PHR is included in ascending order based on a cell index.

14. The method of claim 13, wherein if simultaneous transmission of control channel and data channel is configured, the information on the PH for the primary cell includes information on a type II PH and information on a type I PH, and the information on the type II PH is followed by the information on the type I PH.

15. The method of claim 13, wherein information on a type I PH of the primary cell is followed by information on a type I PH of the at least one secondary cell reported in the extended PHR.

16. A base station in a mobile communication system, the base station comprising:

a receiver for receiving a medium access control protocol data unit (MAC PDU) including a header and an extended power headroom report (PHR), the header including a logical channel identifier (LCID) for identifying the extended PHR; and at least one processor configured to identify power headrooms (PHs) included in the PHR, wherein the extended PHR includes one or more power headrooms (PHs) and a bitmap, the bitmap indicating whether at least one PH for at least one secondary cell is reported.

17. The base station of claim 16, wherein the header further includes a length of the extended PHR.

18. The base station of claim 16, wherein information on PHs for a primary cell and at least one secondary cell reported in the extended PHR is included in ascending order based on a cell index.

19. The base station of claim 18, wherein if simultaneous transmission of control channel and data channel is configured, the information on the PH for the primary cell includes information on a type II PH and information on a type I PH, and the information on the type II PH is followed by the information on the type I PH.

20. The base station of claim 18, wherein information on a type I PH of the primary cell is followed by information on a type I PH of the at least one secondary cell reported in the extended PHR.

* * * * *